United States Patent
Jeon

(10) Patent No.: US 10,444,937 B2
(45) Date of Patent: Oct. 15, 2019

(54) METHOD FOR DISPLAYING APPLICATIONS AND ELECTRONIC DEVICE THEREOF

(71) Applicant: Samsung Electronics Co., Ltd, Gyeonggi-do (KR)

(72) Inventor: Yong-Joon Jeon, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 172 days.

(21) Appl. No.: 14/092,683

(22) Filed: Nov. 27, 2013

(65) Prior Publication Data

US 2014/0149908 A1 May 29, 2014

(30) Foreign Application Priority Data

Nov. 28, 2012 (KR) .......................... 10-2012-0135799

(51) Int. Cl.
*G06F 3/048* (2013.01)
*G06F 3/0482* (2013.01)
*G06F 3/0486* (2013.01)
*G06F 3/0481* (2013.01)
*G06F 3/0488* (2013.01)

(52) U.S. Cl.
CPC .......... *G06F 3/0482* (2013.01); *G06F 3/0486* (2013.01); *G06F 3/04817* (2013.01); *G06F 3/04886* (2013.01)

(58) Field of Classification Search
CPC .......................................... G06F 3/048–04886
See application file for complete search history.

(56) References Cited

U.S. PATENT DOCUMENTS

| 8,972,878 | B2 | 3/2015 | Mohler et al. | |
|---|---|---|---|---|
| 2003/0076322 | A1* | 4/2003 | Ouzts | G06F 3/0481 345/440 |
| 2006/0161868 | A1* | 7/2006 | Van Dok | G06F 3/0481 715/835 |
| 2007/0061745 | A1* | 3/2007 | Anthony | G06F 3/0481 715/764 |
| 2007/0083827 | A1* | 4/2007 | Scott | G06F 9/451 715/811 |
| 2008/0263024 | A1 | 10/2008 | Landschaft et al. | |
| 2008/0297482 | A1 | 12/2008 | Weiss | |

(Continued)

FOREIGN PATENT DOCUMENTS

| CN | 101782832 A | 7/2010 |
|---|---|---|
| CN | 102289446 A | 12/2011 |

(Continued)

OTHER PUBLICATIONS

International Search Report dated Mar. 10, 2014 in connection with International Application No. PCT/KR2013/010912, 4 pages.

(Continued)

*Primary Examiner* — Kevin L Young
*Assistant Examiner* — Linda Huynh

(57) ABSTRACT

A method controls an electronic device. The method includes detecting a folder display event. The method also includes, in response to detecting the event, displaying a folder and simultaneously displaying a quick menu window including at least one application included in the folder on an area adjacent to the folder without any input with respect to the folder.

12 Claims, 11 Drawing Sheets

(56) References Cited

U.S. PATENT DOCUMENTS

| | | | |
|---|---|---|---|
| 2008/0307364 A1* | 12/2008 | Chaudhri | G06F 3/0483 715/836 |
| 2010/0022112 A1 | 1/2010 | Duesterhoeft et al. | |
| 2010/0085384 A1* | 4/2010 | Kim | G06F 3/0488 345/660 |
| 2010/0185681 A1* | 7/2010 | Han | G06F 3/04817 707/802 |
| 2010/0211872 A1 | 8/2010 | Rolston et al. | |
| 2010/0257059 A1* | 10/2010 | Fujioka | G06F 3/048 705/14.66 |
| 2011/0004705 A1 | 1/2011 | Kato et al. | |
| 2011/0072492 A1* | 3/2011 | Mohler | G06F 3/04817 726/3 |
| 2011/0252372 A1* | 10/2011 | Chaudhri | G06F 3/04817 715/835 |
| 2011/0296328 A1* | 12/2011 | Jikeya | G06F 3/04817 715/769 |
| 2012/0026111 A1* | 2/2012 | Kasahara | G06F 3/0485 345/173 |
| 2012/0026113 A1* | 2/2012 | Kasahara | G06F 3/0482 345/173 |
| 2012/0030623 A1 | 2/2012 | Hoellwarth | |
| 2012/0084692 A1* | 4/2012 | Bae | G06F 3/04817 715/769 |
| 2012/0084732 A1* | 4/2012 | Filippov | G06F 3/0482 715/838 |
| 2012/0287154 A1 | 11/2012 | Yook et al. | |
| 2013/0014040 A1* | 1/2013 | Jagannathan | G06Q 50/01 715/765 |
| 2013/0198506 A1* | 8/2013 | Smith | G06F 1/1684 713/100 |
| 2013/0239059 A1* | 9/2013 | Chen | G06F 3/0488 715/835 |

FOREIGN PATENT DOCUMENTS

| | | |
|---|---|---|
| EP | 2278447 A1 | 1/2011 |
| EP | 2431852 A2 | 3/2012 |
| KR | 10-2005-0080901 | 8/2005 |
| KR | 10-2010-0098802 | 9/2010 |
| KR | 10-2011-0041915 | 4/2011 |
| KR | 10-2011-0103228 | 9/2011 |
| KR | 01-2012-0006158 | 1/2012 |
| KR | 10-2012-0021925 | 3/2012 |
| KR | 10-2012-0046622 | 5/2012 |
| RU | 2010127259 | 1/2012 |

OTHER PUBLICATIONS

Written Opinion of the International Searching Authority dated Mar. 10, 2014 in connection with International Application No. PCT/KR2013/010912, 8 pages.

Russian Office Action dated Jun. 8, 2016 in connection with Russian Application No. 2015120078, 16 pages.

Foreign Communication From a Related Counterpart Application, Russian Appluacation No. 2015120078/08(031042), Decision on Grant dated Jan. 9, 2017, 19 pages.

Communication from a foreign patent office in a counterpart foreign application, The State Intellectual Property Office of P.R. China, "The First Office Action," Application No. CN 201310626146.2, dated Aug. 25, 2017, 19 pages.

Communication from a foreign patent office in a counterpart foreign application, European Patent Office, "European Search Report," Application No. EP 13 19 4732, dated Sep. 25, 2017, 8 pages.

IP Australia, "Examination report No. 2 for standard patent application," Application No. AU2013263738, dated Oct. 10, 2018, 4 pages.

National Intellectual Property Administration, PRC, "The Third Office Action," Application No. CN 201310626146.2, dated Dec. 3, 2018, 23 pages.

Australian Government IP Australia, "Examination report No. 1 for standard patent application," Application No. AU 2013263738, dated Jul. 6, 2018, 3 pages.

Notice of Preliminary Rejection regarding Korean Patent Application No. 10-2012-0135799, dated Mar. 11, 2019, 11 pages.

European Patent Office Communication regarding Application No. 13194732.7, dated Apr. 3, 2019, 6 pages.

IP Australia Examination report No. 3 for standard patent application regarding Application No. 2013263738, dated May 7, 2019, 5 pages.

National Office of Intellectual Property Examination Result regarding Vietnamese Application No. 1-2015-02311, dated Jun. 27, 2019, 4 pages.

IP Australia Examination report No. 4 for standard patent application regarding Application No. 2013263738, dated Jul. 5, 2019, 5 pages.

* cited by examiner

METHOD FOR DISPLAYING APPLICATIONS AND ELECTRONIC DEVICE THEREOF

CROSS-REFERENCE TO RELATED APPLICATION(S) AND CLAIM OF PRIORITY

The present application is related to and claims priority under 35 U.S.C. § 119 to an application filed in the Korean Intellectual Property Office on Nov. 28, 2012 and assigned Serial No. 10-2012-0135799, the contents of which are incorporated herein by reference.

TECHNICAL FIELD

The present disclosure relates generally to an electronic device, and in particular, to a method and apparatus for displaying applications in an electronic device.

BACKGROUND

With the increase in use of electronic devices, electronic device manufacturers have competitively developed electronic devices for providing various convenient option functions in order to secure many users. In particular, various applications for providing various functions for convenience and leisure activities of users have been provided competitively. Therefore, electronic devices include several to tens of applications.

If an electronic device includes tens of applications, it is not easy for a user to find a desired application. Therefore, a conventional electronic device manages a plurality of applications on a folder basis, thereby facilitating the user's access to respective applications. For example, the electronic device creates a game folder and a life folder according to user control and adds icons representing a plurality of game applications to the game folder and icons representing applications, such as a scheduler, a morning call, and a traffic guide-related application which are associated to the user's daily life to the life folder, thereby allowing the user to easily access a relevant application through folders.

That is, in a state in which a plurality of applications are arranged on the folder basis in the electronic device, a user recognizes a folder including a specific application in advance and selects the folder. Thereafter, the user selects the specific application to be executed in the selected folder, thereby executing the specific application. However, the above process should be repeatedly performed whenever the user wants to execute the specific application.

Therefore, there is a need for a method for allowing a user to easily recognize and execute applications included in a folder.

SUMMARY

To address the above-discussed deficiencies of the prior art, it is a primary object to provide an apparatus and method for providing a quick menu window which enables faster execution of applications included in a folder for each folder in an electronic device.

Another object of the present disclosure is to provide an apparatus and method for displaying a predetermined number of applications among a plurality of applications included in a folder on a quick menu window for the folder in an electronic device.

Another object of the present disclosure is to provide an apparatus and method for indicating that a folder and a quick menu window for the folder are associated with each other in an electronic device.

Another object of the present disclosure is to provide an apparatus and method for determining the number of application to be displayed on a quick menu window in an electronic device.

Another object of the present disclosure is to provide an apparatus and method for determining applications to be displayed on a quick menu window according to their predetermined priorities in an electronic device.

Another object of the present disclosure is to provide an apparatus and method for rapidly executing applications by using a quick menu window for each folder in an electronic device.

According to an aspect of the present disclosure, a method for controlling an electronic device includes: detecting a folder display event; and when the event is detected, displaying a folder and simultaneously displaying a quick menu window including at least one application included in the folder on an area adjacent to the folder without any input with respect to the folder.

According to another aspect of the present disclosure, a method for controlling an electronic device includes: adding an application to a folder; and displaying the quick menu window including the application on the area adjacent to the folder depending on whether the added application satisfies a predetermined condition.

According to another aspect of the present disclosure, an electronic device includes: at least one processor; a touch sensitive display; a memory; and at least one program stored in the memory and configured to be executable by the processor, wherein the program includes instructions for: detecting a folder display event; and, when the event is detected, displaying a folder and simultaneously displaying a quick menu window including at least one application included in the folder on an area adjacent to the folder without any input with respect to the folder.

According to another aspect of the present disclosure, an electronic device includes: at least one processor; a touch sensitive display; a memory; and at least one program stored in the memory and configured to be executable by the processor, wherein the program includes instructions for: wherein the program comprises instructions for: adding an application to a folder; and displaying the quick menu window including the application on the area adjacent to the folder depending on whether the added application satisfies a predetermined condition.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1A through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. Exemplary embodiments of the present disclosure will be described herein below with reference to the accompanying drawings. In the following description of the exemplary embodiments, detailed descriptions of well-known functions or configurations will be omitted since they would unnecessarily obscure the subject matters of the present disclosure. Also, the terms used herein are defined according to the functions of the present disclosure. Thus, the terms may vary depending on users' or operators' intentions or practices. Therefore, the terms used herein should be understood based on the descriptions made herein.

In the following description, examples of the electronic device may include a mobile communication terminal capable of touch input, a smart phone, a tablet PC, a digital camera, an MP3 player, a navigation device, a laptop computer, a laptop computer, a netbook, a computer, a television, a refrigerator, and an air conditioner.

Figure 1A:
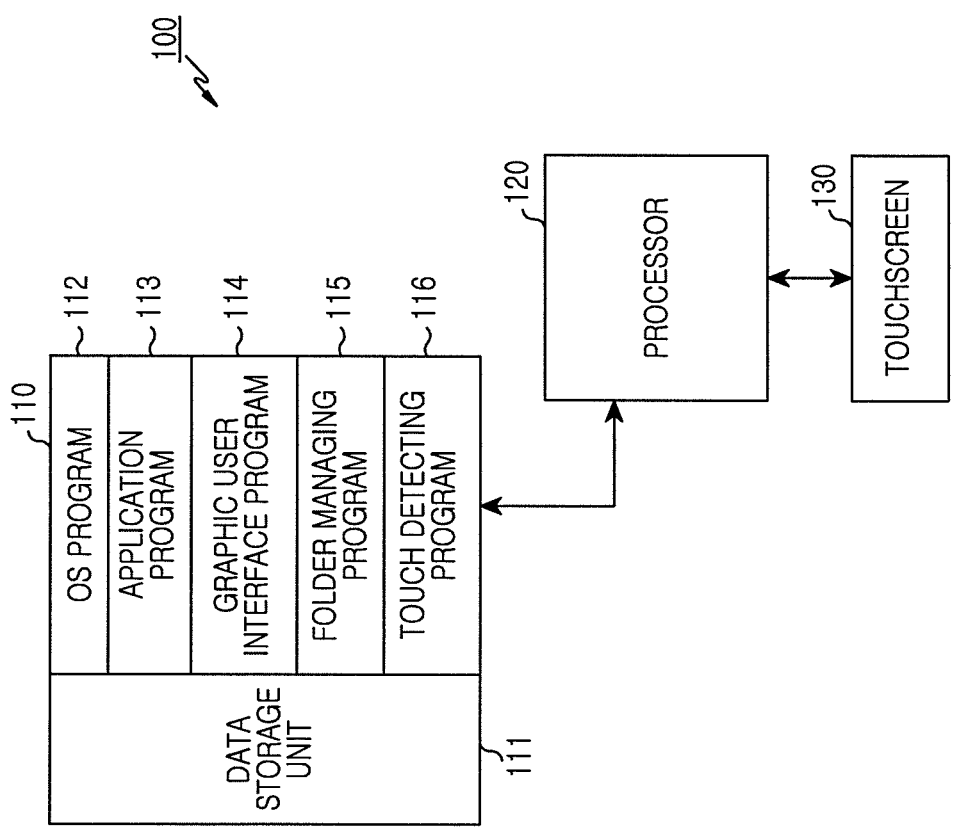
FIG. 1A illustrates a block diagram of an electronic device for displaying a quick menu window for a folder according to an exemplary embodiment of the present disclosure.

FIG. 1A illustrates a block configuration of an electronic device for displaying a quick menu window for a folder according to an exemplary embodiment of the present disclosure.

Referring to FIG. 1A, the electronic device 100 includes a memory 110, a processor 120 and a touchscreen 130. The memory 110 may be configured in plurality, and the processor 120 may also be configured in plurality.

For example, the memory 110 includes a data storage unit 111, an operating system (OS) program 112, an application program 113, a Graphic User Interface (GUI) program 114, a folder managing program 115, and a touch detecting program 116. Since the program that is a software component may be represented as a set of instructions, the program may be referred to as an instruction set. The program may also be referred to as a module.

The memory 110 may store one or more programs including instructions for performing embodiments of the present disclosure.

The data storage unit 111 stores data generated during the performance of a function corresponding to the program stored in the memory 110. The data storage unit 111 according to the present disclosure may store the priorities of applications to be displayed on a quick menu window for each folder. The quick menu window is a window including a predetermined number of applications, which is displayed on an area adjacent to a folder, in order to rapidly execute the predetermined number of applications included in the folder with respect to respective folders. In this case, the priorities of applications may be determined according to user settings, in descending order of the frequency of use for a predetermined period of time, in descending order of the frequency of use for each location, according to user settings for each location, in descending order of the frequency of use for each time zone, in descending order of installation time of applications in the electronic device, or in descending order of addition time to the folder. In addition, the data storage unit 111 may store the number of applications to be displayed on the quick menu window for each folder. For example, the data storage unit 111 may store 3 as the number of applications to be included in a game folder and may store 1 as the number of applications to be included in a shopping folder. Herein, the number of applications to be displayed on the quick menu window for each folder may be determined based on at least one of system settings, user settings, the frequency of user access to each folder, a location, and time.

The OS program 112 (for example, WINDOWS, LINUX, Darwin, RTXC, UNIX, OS X, or an embedded OS such as VxWorks) includes various software components for controlling general system operations. For example, general system operation controls include memory control/management, storage hardware (device) control/management, and power control/management. The OS program 112 also performs a function for enabling smooth communication between various hardware elements (devices) and software components (programs).

The application program 113 includes a browser application, an e-mail application, a message application, a word processing application, an address book application, a widget application, a digital right management (DRM) application, a voice recognition application, a voice replication application, a position determining function application, a location-based service (LBS) application, a telephone application, and the like.

The graphic user interface program 114 includes at lease one software component for providing a graphic user interface between a user and the electronic device 100. That is, the graphic user interface program 114 includes at lease one software component for displaying user interface information on the touchscreen 130. The graphic user interface program 114 according to the present disclosure includes instructions for displaying the quick menu window for each folder on an area adjacent to a folder. For example, the graphic user interface program 114 may display a quick menu window for a first folder on an area adjacent to the first folder. In this case, the graphic user interface program 114 may display at least one application among a plurality of applications included in a folder on a quick menu window for the folder and also a graphical effect representing that the folder is associated with the quick menu window displayed on an area adjacent to the folder. In particular, the graphic user interface program 114 sets the layout of the application to be displayed on the area adjacent to the folder, such that the relevant layout is identical to that of other applications, icons, or folders displayed on a background image (or wallpaper). Therefore, the application to be displayed on the area adjacent to the folder is displayed with the same spacing and size as those of the other applications, icons, or folders displayed on the background image.

In addition, the graphic user interface program 114 includes instructions for adjusting the size of the quick menu window according to the direction and dragging length of a detected drag and displaying the quick menu window. For example, when a right drag associated with the quick menu window is detected, the graphic user interface program 114 includes instructions for expanding the quick menu window to the right thereof according to the dragging length of the detected drag, and displaying the quick menu window. As another example, when a downward drag associated with the folder is detected, the graphic user interface program 114 includes instructions for displaying the quick menu window below the folder according to the drag length of the detected drag.

In addition, when the quick menu window is expanded, the graphic user interface program 114 includes instructions for adding an application to the quick menu window according to the size of the expanded quick menu window.

The folder managing program 115 manages a quick menu window for a folder and applications to be displayed on the quick menu window with respect to respective folders. The folder managing program 115 includes instructions for displaying a folder and simultaneously displaying a quick menu window including at least one application included in the folder on an area adjacent to the folder, when a folder display event is detected. For example, in a case where a first application to a fifth application are included in a first folder, the folder managing program 115 includes instructions for displaying the first folder and simultaneously displaying a quick menu window including the first application and the third application included in the first folder on an area adjacent to the first folder, when an event for displaying the first folder is detected. That is, the folder managing program 115 includes instructions for displaying the folder and the quick menu window for the folder simultaneously before a separate input (for example, user gesture) associated with the folder is detected. On the contrary, when the separate input associated with the folder is detected, the folder managing program 115 may include instructions for displaying all applications included in the folder on which the input is detected, or displaying a graphic effect for folder movement or folder deletion.

In addition, the folder managing program 115 may determine the number of applications to be displayed on the quick menu window. For example, the folder managing program 115 may determine the number of applications to be displayed on the quick menu window based on at least one of user control, a location, the frequency of access to the folder, and time, and display a determined number of applications on the quick menu window. As another example, the folder managing program 115 may display a number of applications, equal to a number predetermined in system design on the quick menu window.

When the touch detecting program 116 detects a drag associated with the quick menu window, the folder managing program 115 may change the number of applications to be displayed on the quick menu window while adjusting the size and shape of the quick menu window according to the direction and drag length of the detected drag.

In addition, the folder managing program 115 may select at least one application based on the priorities of applications included in a folder and display the selected at least one application on the quick menu window. In this case, the priorities of applications may be determined according to user settings, in descending order of the frequency of use for a predetermined period of time, in descending order of the frequency of use for each location, according to user settings for each location, in descending order of the frequency of use for each time zone, in descending order of installation time of applications in the electronic device 100, or in descending order of addition time to the folder. For example, the folder managing program 115 may display two applications having highest priorities, which are determined by the user, among a plurality of applications included in a first folder on a quick menu window for the first folder. As another example, the folder managing program 115 may display three applications having high frequencies of use among a plurality of applications included in a second folder on a quick menu window for the second folder. As another example, when the user frequently uses a first application included in the first folder at a specific location, the folder managing program 115 may display the first application on the quick menu window for the first folder. As another example, when the first application is added to the first folder, the folder managing program 115 may display the first application on the quick menu window for the first folder. Herein, although the above embodiment has been described taking, as an example, a configuration in which the priorities of applications are set through user settings, a location, time, the frequency of use, and an installation time, the priorities of applications may be set by using a variety of information (for example, life log) which is input to the electronic device.

In addition, when the priorities of the applications included in the folder are changed, the folder managing program 115 may updates the quick menu window, on which the applications are displayed, according to the changed priorities of the applications to display the quick menu window. For example, in a state in which three applications have been displayed on the quick menu window for the first folder, when the first application is added to the quick menu window, the folder managing program 115 may expand the size of the quick menu window and display the first application additionally, so that four applications are displayed in total on the quick menu window. For example, in a state in which three applications have been displayed on the quick menu window for the first folder, when the first application is added to the quick menu window, the folder managing program 115 may display three applications having the highest priorities on the quick menu window among four applications including the first application.

In addition, when a touch is detected on an application displayed on the quick menu window, the folder managing program 115 may execute the application on which the touch is detected.

The touch detecting program 116 detects a touch input on a touch-sensitive surface in conjunction with the touchscreen 130. That is, the touch detecting program 116 determines whether contact has occurred on the touch-sensitive surface, whether there is movement of the contact, the direction of the movement, movement time, and whether the contact has ceased. Determining movement of the point of contact may include determining speed (magnitude), velocity (magnitude and direction), and/or an acceleration (including magnitude and/or direction) of the point of contact. The touch detecting program 116 according to the present disclosure may detect a drag on the quick menu window in order to adjust the size of the quick menu window. In addition, the touch detecting program 116 may detect a touch on an application displayed on the quick menu window.

Although not illustrated, the processor 120 may include at least one processor and a peripheral interface. In addition, the processor 120 executes a specific program (instruction set) stored in the memory 110 and performs a plurality of specific functions corresponding to the program.

The touchscreen 130 is a touch-sensitive display which provides an interface for touch input/output between the electronic device 100 and the user. The touchscreen 130 is a medium that detects a touch (or contact) through a touch sensor (not illustrated), transmits the detected touch input to the electronic device 100, and visually provides an output from the electronic device 100 to the user. That is, the touchscreen 130 provides a visual output, such as text, graphic and video, to the user in response to the touch input.

The touchscreen 130 includes a touch-sensitive surface that accepts a user's touch input, and detects the user's touch input based on a haptic contact, a tactile contact, or combination thereof. For example, a touch-detected point on the touchscreen 130 corresponds to the width (digit) of a finger used for contact with the touch-sensitive surface. In addition, the touchscreen 130 detects a contact of an external device, such as a stylus pen, through the touch-sensitive surface. The detected contact is converted into interaction with user-interface objects (e.g., one or more soft keys) that are displayed on the touchscreen.

The touchscreen 130 provides an interface for touch input/output between the electronic device 100 and the user. Specifically, the touchscreen 130 is a medium that transmits a touch input to the electronic device 100, and visually provides an output from the electronic device 100 to the user. The touchscreen 130 may use various display technologies, such as an LCD (liquid crystal display), an LED (Light Emitting Diode), an LPD (light emitting polymer display), an OLED (Organic Light Emitting Diode), an AMOLED (Active Matrix Organic Light Emitting Diode), or an FLED (Flexible LED). The touchscreen 130 according to the present disclosure is not limited to the touchscreen using such these display technologies. In addition, the touchscreen 130 may detect contact and any movement or breaking or ceasing thereof using a variety of touch detection (sensing) technologies, such as capacitive detection, resistive detection, an infrared (IR) ray detection, and a surface sound wave detection. The touchscreen 130 according to the present disclosure may display a folder and simultaneously, display at least one application included in the folder on a quick menu window on an area adjacent to the folder. In addition, the touchscreen 130 may detect a touch on the application displayed on the quick menu window.

Figure 1B:
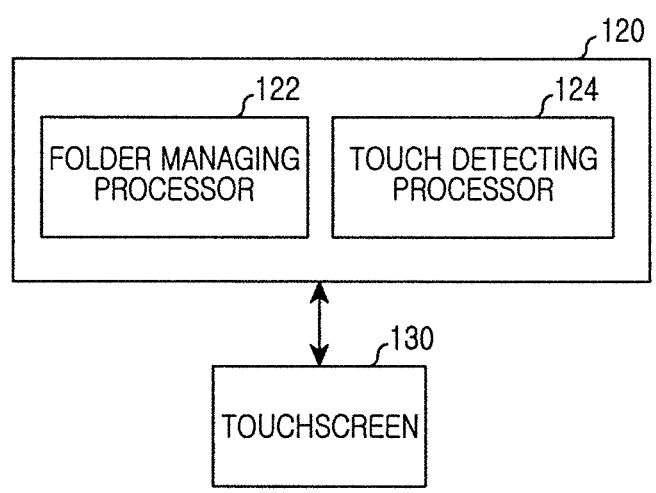
FIG. 1B illustrates a block diagram of a processor for displaying a quick menu window for a folder according to an exemplary embodiment of the present disclosure.

FIG. 1B illustrates a block diagram of a processor for displaying a quick menu window for a folder according to an exemplary embodiment of the present disclosure.

Referring to FIG. 1B, the processor 120 includes a folder managing processor 122 and a touch detecting processor 124.

The folder managing processor 122 manages a quick menu window for a folder and applications to be displayed on the quick menu window with respect to respective folders. The folder managing processor 122 includes instructions for displaying a folder and simultaneously displaying a quick menu window including at least one application included in the folder on an area adjacent to the folder, when a folder display event is detected. For example, in a case where a first application to a fifth application are included in a first folder, the folder managing processor 122 includes instructions for displaying the first folder and simultaneously displaying a quick menu window including the first application and the third application included in the first folder on an area adjacent to the folder, when an event for displaying the first folder is detected. That is, the folder managing processor 122 includes instructions for displaying the folder and the quick menu window for the folder simultaneously before a separate input (for example, a user gesture) associated with the folder is detected. On the contrary, when the separate input associated with the folder is detected, the folder managing processor 122 may include instructions to display all applications included in the folder on which the input is detected, or to display a graphic effect for folder movement or folder deletion.

In addition, the folder managing processor 122 may determine the number of applications to be displayed on the quick menu window. For example, the folder managing processor 122 may determine the number of applications to be displayed on the quick menu window based on at least one of user control, a location, the frequency of access to the folder, and time, and display a determined number of applications on the quick menu window. As another example, the folder managing processor 122 may display a number of applications equal to a number predetermined in system design on the quick menu window.

When the touch detecting processor 124 detects a drag for the quick menu window, the folder managing processor 122 may change the number of applications to be displayed on the quick menu window while adjusting the size and shape of the quick menu window according to the direction and length of the detected drag.

In addition, the folder managing processor 122 may select at least one application based on the priorities of applications included in a folder and display the selected at least one application on the quick menu window. In this case, the priorities of applications may be determined according to user settings, in descending order of the frequency of use for a predetermined period of time, in descending order of the frequency of use for each location, according to user settings for each location, in descending order of the frequency of use for each time zone, in descending order of installation time of applications in the electronic device 100, or in descending order of addition time to the folder. For example, the folder managing processor 122 may display two applications having highest priorities, which are determined by the user, among a plurality of applications included in a first folder on the quick menu window for the first folder. As another example, the folder managing processor 122 may display three applications having the high frequencies of use among a plurality of applications included in a second folder on a quick menu window for the second folder. As another example, when the user frequently uses a first application included in the first folder at a specific location, the folder managing processor 122 may display the first application on the quick menu window for the first folder. As another example, when the first application is added to the first folder, the folder managing processor 122 may display the first application on the quick menu window for the first folder. Herein, although the above embodiment has been described taking, as an example, a configuration in which the priorities of applications are set through user settings, a location, time, the frequency of use, and an installation time, the priorities of applications may be set by using a variety of information (for example, life log) which is input to the electronic device.

In addition, when the priorities of the applications included in the folder are changed, the folder managing processor 122 may updates the quick menu window, on which the applications are displayed, according to the changed priorities of the applications and display the quick menu window. For example, in a state where three applications have been displayed on the quick menu window for the first folder, when the first application is added to the quick menu window, the folder managing processor 122 may expand the quick menu window and display the first application additionally, so that four applications are displayed in total on the quick menu window. For example, in a state where three applications have been displayed on the quick menu window for the first folder, when the first application is added to the quick menu window, the folder managing processor 122 may display three applications having the high priorities on the quick menu window among four applications including the first application.

In addition, when a touch is detected on an application displayed on the quick menu window, the folder managing processor 122 may execute the application on which the touch is detected.

The touch detecting processor 124 detects a touch input on a touch-sensitive surface in conjunction with the touchscreen 130. That is, the touch detecting processor 124 determines whether contact has occurred on the touch-sensitive surface, whether there is movement of the contact, the direction of the movement, movement time, and whether the contact has ceased. Determining movement of the point of contact may include determining speed (magnitude), velocity (magnitude and direction), and/or an acceleration (including magnitude and/or direction) of the point of contact. The touch detecting processor 124 according to the present disclosure may detect a drag on the quick menu window in order to adjust the size of the quick menu window. In addition, the touch detecting processor 124 may detect a touch with respect to an application displayed on the quick menu window.

Figure 2:
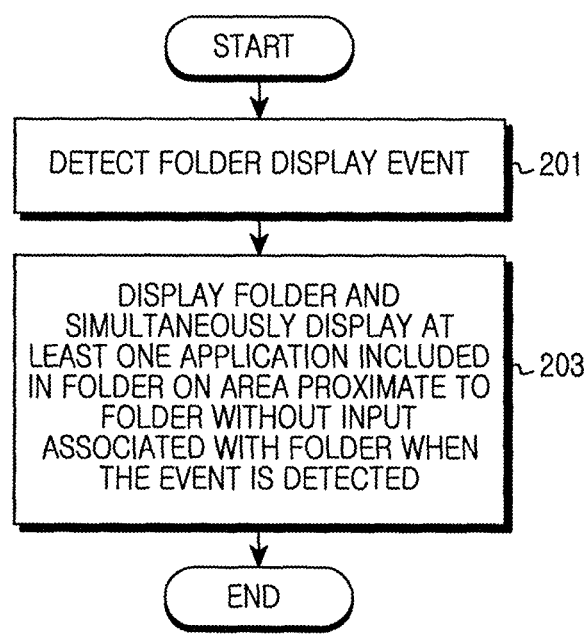
FIG. 2 illustrates a flowchart for a process of displaying a folder and an application included in the folder simultaneously on an area adjacent to the folder in the electronic device according to an exemplary embodiment of the present disclosure.

FIG. 2 illustrates a flowchart for a process of displaying a folder and an application included in the folder simultaneously on an area adjacent to the folder in the electronic device 100 according to an exemplary embodiment of the present disclosure.

Referring to FIG. 2, in step 201, the electronic device 100 detects a folder display event. Thereafter, in step 203, the electronic device 100 displays a folder and an application included in the folder simultaneously on an area adjacent to the folder without user control when the folder display event is detected in a state where no folder is displayed. In order words, the electronic device 100 displays the folder and the application included in the folder simultaneously on the area adjacent to the folder without receiving an input (for example, an input for displaying a folder) on the folder. In this case, the applications displayed on the area adjacent to the folder may be arranged according to their predetermined priorities. In addition, the number of the applications displayed on the area adjacent to the folder may be set by a user and may be changed according to user control. In this case, the electronic device 100 may detect a touch on the application displayed on the area adjacent to the folder and execute the application on which the touch is detected.

Figure 3:
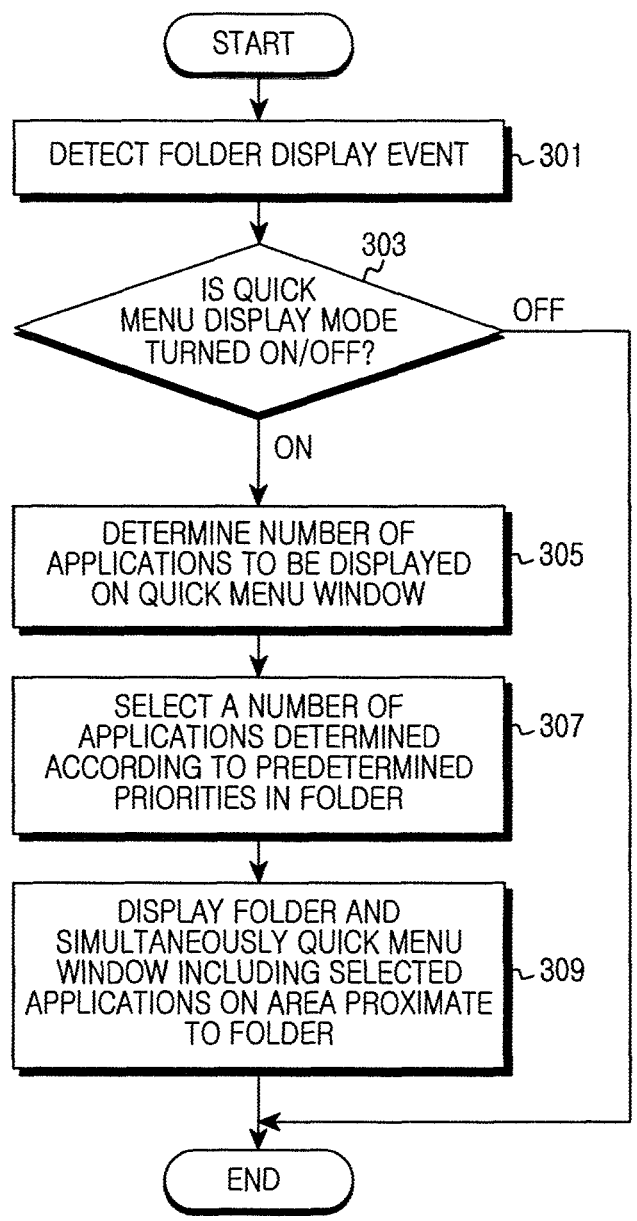
FIG. 3 illustrates a flowchart for a process for displaying a quick menu window for a folder on an area adjacent to the folder when the folder is displayed in the electronic device according to an exemplary embodiment of the present disclosure.

FIG. 3 illustrates a flowchart for a process for displaying a quick menu window for a folder on an area adjacent to the folder when the folder is displayed in the electronic device 100 according to an exemplary embodiment of the present disclosure.

Referring to FIG. 3, in step 301, the electronic device 100 detects a folder display event. Thereafter, in step 303, the electronic device 100 checks whether a quick menu display mode for displaying a quick menu window for the folder is turned on or off. In this case, the electronic device 100 may turn on or off the quick menu display mode according to user control.

If the quick menu display mode for displaying the quick menu window for the folder is turned on, the electronic device 100 determines the number of applications to be displayed on the quick menu window in step 305. Herein, the number of applications to be displayed on the quick menu window for the folder may be predetermined in system design. The number of applications may be determined according to user control. The number of applications may be determined to be the number of applications satisfying a specific condition. In addition, the number of applications to be displayed on the quick menu window of each folder may be determined equally for all folders, or differently for respective folders. In addition, in the case of determining the number of applications to be displayed on the quick menu window of each folder, the number of applications may be determined by using an identical condition to all folders or using different conditions for respective folders. For example, the electronic device may determine the number of applications to be displayed on quick menu windows respectively associated with a first folder to a fourth folder to be a number predetermined in system design, that is, three. As another example, when a user sets the number of applications to be displayed on the quick menu window for the first folder to be three, the electronic device 100 may determine the number of applications to be displayed on the quick menu window for the first folder to be three. As another example, when there are two applications, for each of which the number of uses is more than 100 among applications included in the second folder, the electronic device 100 may determine the number of applications to be displayed on the quick menu window for the second folder to be two. As another example, when the electronic device 100 is located at an area A and there are three applications for each of which the number of uses is more than 5 for recent seven days at the area A among applications included in the third folder, the electronic device 100 may determine the number of applications to be displayed on the quick menu window for the third folder to be three. As another example, when the present time is 10 a.m. and the number of applications used at 10 a.m. during recent one month is one among applications included in the fourth folder, the electronic device 100 may determine the number of applications to be displayed on the quick menu window for the fourth folder to be one.

Thereafter, in step 307, the electronic device 100 selects a number of applications that is determined in step 305 according to the predetermined priorities of applications included in the folder. In this case, the priorities of applications may be determined according to user settings, in descending order of the frequency of use for a predetermined period of time, in descending order of the frequency of use for each location, according to user settings for each location, in descending order of the frequency of use for each time zone, in descending order of installation time of applications in the electronic device 100, or in descending order of addition time to the folder. In addition, in the case of selecting applications to be displayed on a quick menu window of each folder, selection may be performed based on their priorities determined by using an identical condition (user settings, location, frequency of use, time, installation, or the like) to all folders, or based on their priorities determined using different conditions for respective folders. For example, when the number of applications to be displayed on the quick menu window for the first folder is determined to be two, the electronic device 100 may select two applications having high frequencies of use among applications included in the first folder. As another example, when the number of applications to be displayed on the quick menu window for the second folder is determined to be three, the electronic device 100 may identify a location of the electronic device 100 through GPS (not illustrated) and select two applications having high frequencies of use at a current location among applications included in the second folder. As another example, when the number of applications to be displayed on the quick menu window for the third folder is determined to be three, the electronic device 100 may select two applications that are recently added to the third folder among applications included in the third folder. When the priorities of applications are changed, the electronic device 100 may reselect applications according to the changed priorities.

Figure 5:
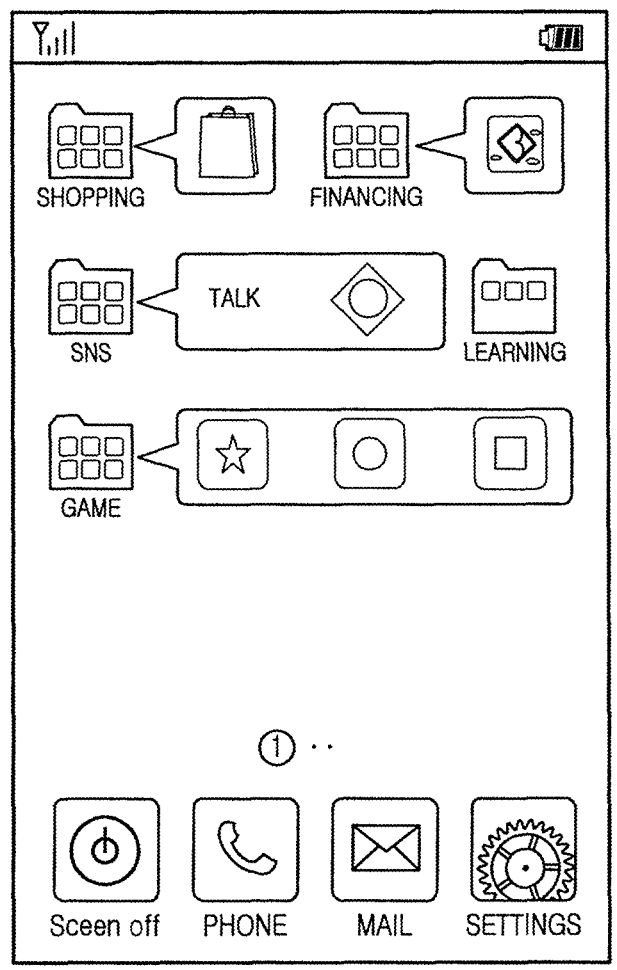
FIG. 5 illustrates an example in which a quick menu window for a folder is displayed on an area adjacent to the folder in the electronic device according to an exemplary embodiment of the present disclosure.
Figure 6:
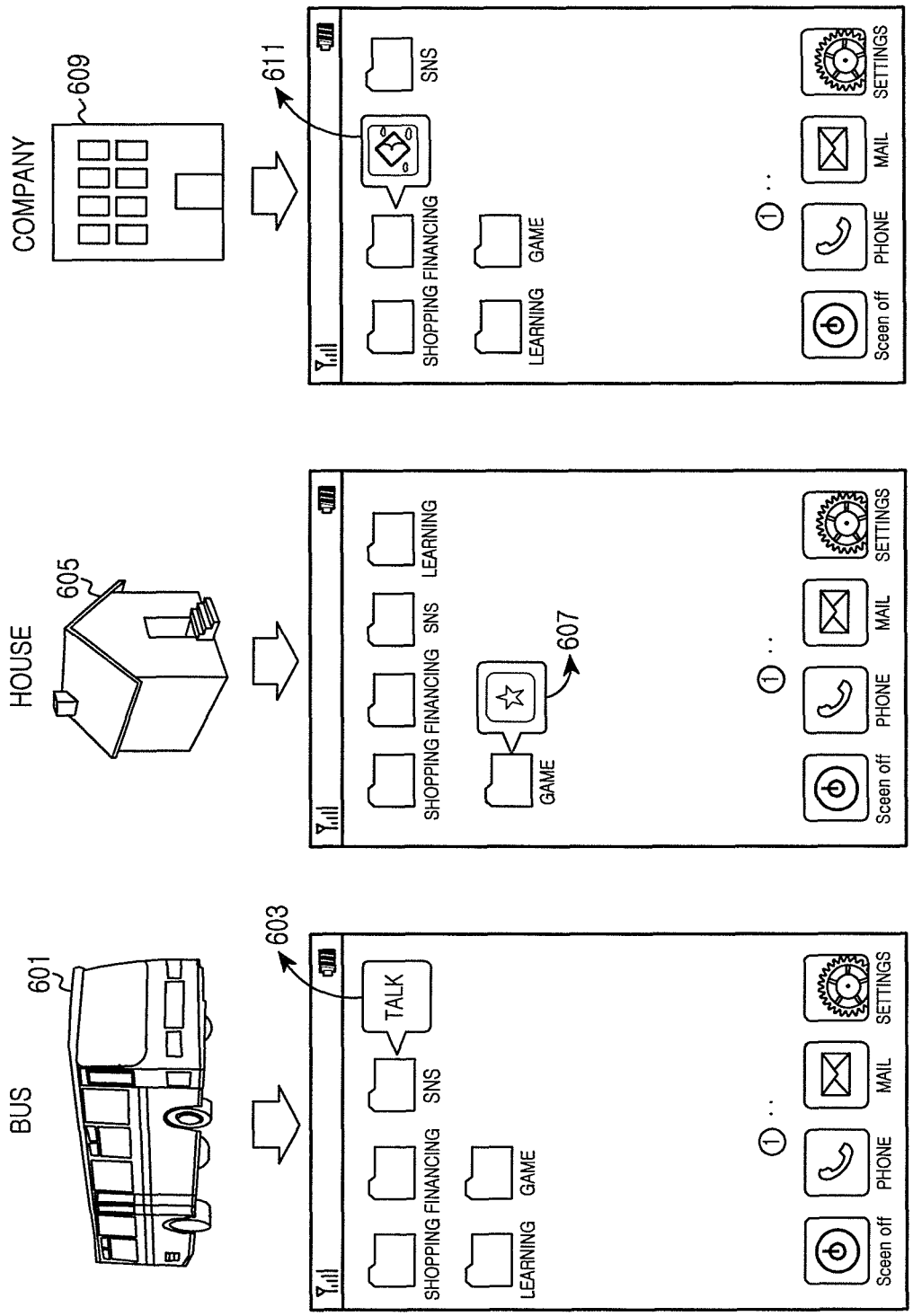
FIG. 6 illustrates an example for changing applications to be displayed on a quick menu window according to location information of an electronic device in the electronic device according to an exemplary embodiment of the present disclosure.

Thereafter, in step 309, the electronic device 100 displays the folder and simultaneously displays a quick menu window including applications selected in step 307 on an area adjacent to the folder. In this case, the electronic device 100 may display the folder and the quick menu window for the folder to indicate that the folder and the quick menu window are associated with each other. For example, as illustrated in FIG. 5, the electronic device 100 may indicate that the folder and the quick menu window are associated with each other with respect to respective folders. In this case, the electronic device 100 may detect that the priorities of applications included in the folder are changed, and automatically change applications displayed on the quick menu window according to the changed priorities. In particular, when the priorities of applications are determined in descending order of the frequency of use for each location, the electronic device 100 may identify a location of the electronic device 100 through GPS (not illustrated) and display applications having high frequencies of use at the identified location among applications included in the folder instead of applications currently displayed on the quick menu window. For example, as illustrated in FIG. 6, in response to identifying that the electronic device 100 is located at a bus 601 through GPS (not illustrated), the electronic device 100 may display a first application 603 having the highest frequency of use at the bus 601 on a quick menu window for a SNS (Social Networking Service) folder. Thereafter, w in response to identifying that the location of the electronic device 100 is changed to a house 605, the electronic device 100 may display a second application 607 having the highest frequency of use at the house 605 on a quick menu window associated with a game folder. In this case, the first application 603 of the SNS folder having a low frequency of use at the house 605 may be not displayed on the quick menu window. Thereafter, in response to identifying that the location of the electronic device 100 is changed to a company 609, the electronic device 100 may display a third application 611 having the highest frequency of use at the company 609 on a quick menu window for a financing folder. In this case, the first application 603 and second application 607 that have a low frequency of use at the company 609 may be not displayed on the quick menu window. Herein, although the above embodiment has been described taking, as an example, a configuration in which the electronic device 100 displays the quick menu window for one folder for each location, quick menu windows respectively associated with a plurality of folders may be displayed for each location.

In addition, the electronic device 100 may change the size of the quick menu window according to user control in the state where the quick menu window is displayed, and change the number of displayed applications based on the changed size of the quick menu window. Thereafter, the electronic device 100 ends the process according to the embodiment of the present disclosure.

Meanwhile, in response to identifying that the quick menu display mode for displaying a quick menu window for a folder is turned off in step 303, the electronic device 100 ends the process according to the embodiment of the present disclosure. Herein, although the above embodiment has been described taking, as an example, a configuration in which the quick menu display mode for displaying a quick menu window is turned on/off equally for all folders, the quick menu display mode for displaying a quick menu window may be turned on/off individually for respective folders.

Figure 4:
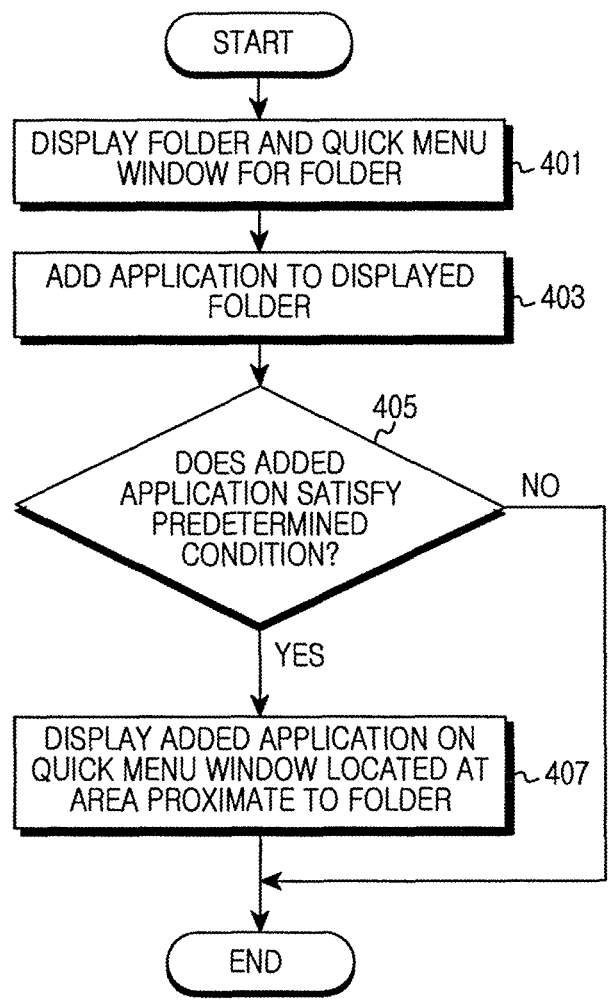
FIG. 4 illustrates a flowchart for a process of an example in which a quick menu window for a folder is displayed on an area adjacent to the folder when an application is added to the folder in the electronic device according to an exemplary embodiment of the present disclosure.

FIG. 4 illustrates a flowchart for a process of an example in which a quick menu window for a folder is displayed on an area adjacent to the folder when an application is added to the folder in the electronic device 100 according to an exemplary embodiment of the present disclosure.

Referring to FIG. 4, in step 401, the electronic device 100 displays a folder and a quick menu window for the folder. Thereafter, in step 403, the electronic device 100 adds an application to the displayed folder. For example, the electronic device 100 may add a first application to a first folder.

Then, in step 405, the electronic device 100 checks whether the added application satisfies a predetermined condition. Herein, the predetermined condition may include at least one of the frequency of application use, the frequency of application use for each location of the electronic device 100, an application name, and an application lately added to the folder. If the added application does not satisfy the predetermined condition, the electronic device 100 ends the process according to another exemplary embodiment.

Figure 7:
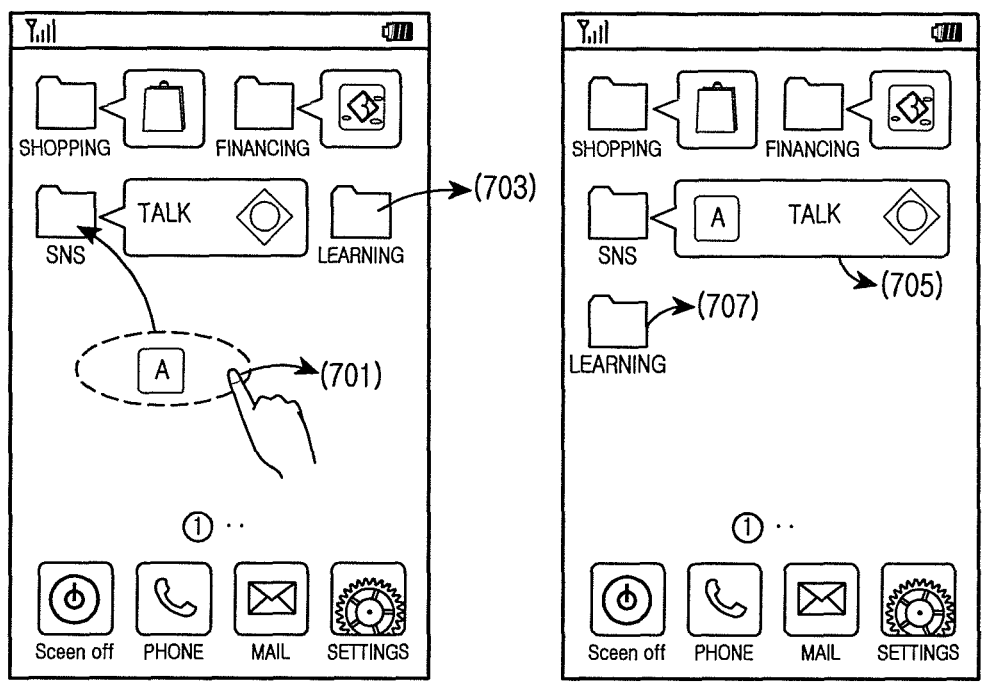
FIG. 7 illustrates an example for displaying an added application when the application is added to a folder in the electronic device according to an exemplary embodiment of the present disclosure.

On the other hand, if the added application satisfies the predetermined condition, the electronic device 100 may display the added application on the quick menu window located at the area adjacent to the folder in step 407. In this case, displayed icons may be rearranged when the size of the quick menu window is changed. For example, as illustrated in FIG. 7, when the first application 701 is added to a SNS folder, the electronic device 100 expands a quick menu window for the SNS folder and adds the first application 701 to the quick menu window. In addition, the electronic device 100 moves a learning folder that had displayed at a location 703 next to the quick menu window before expansion to a location 707 next to the quick menu window after expansion prior to display. Thereafter, the electronic device 100 ends the process according to another embodiment of the present disclosure.

In addition, the electronic device 100 may change the size of the quick menu window according to user control and change the number of displayed applications based on the changed size of the quick menu window.

Figure 8:
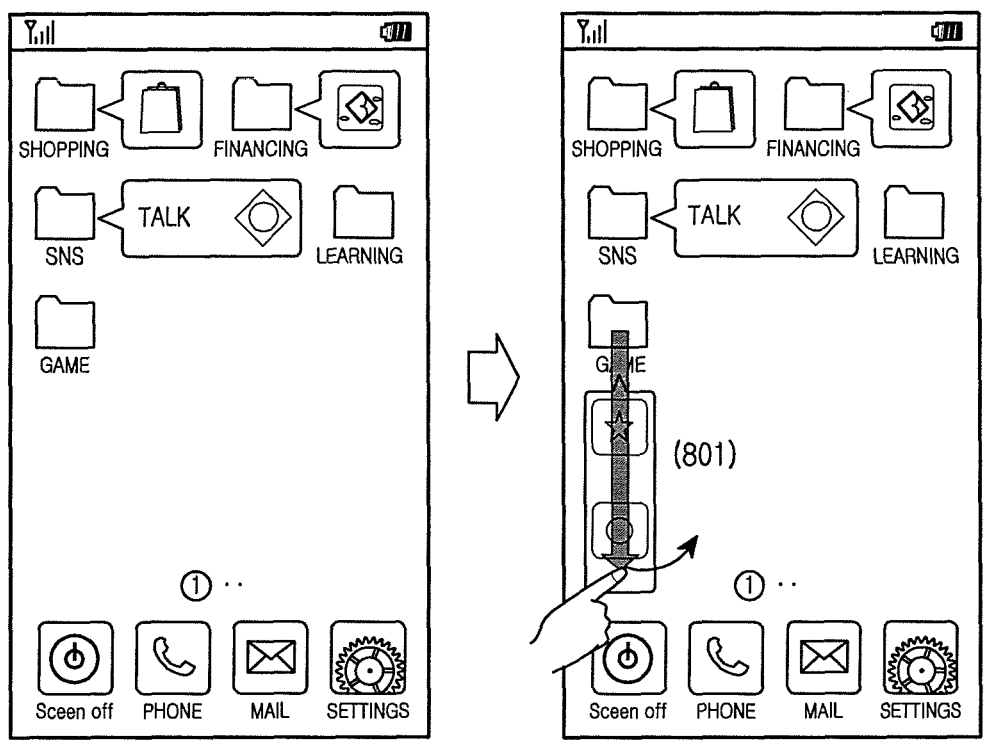
FIGS. 8 to 10 illustrate examples for changing the number of applications displayed on a quick menu window according to a user's dragging in an electronic device according to exemplary embodiments of the present disclosure.
Figure 9:
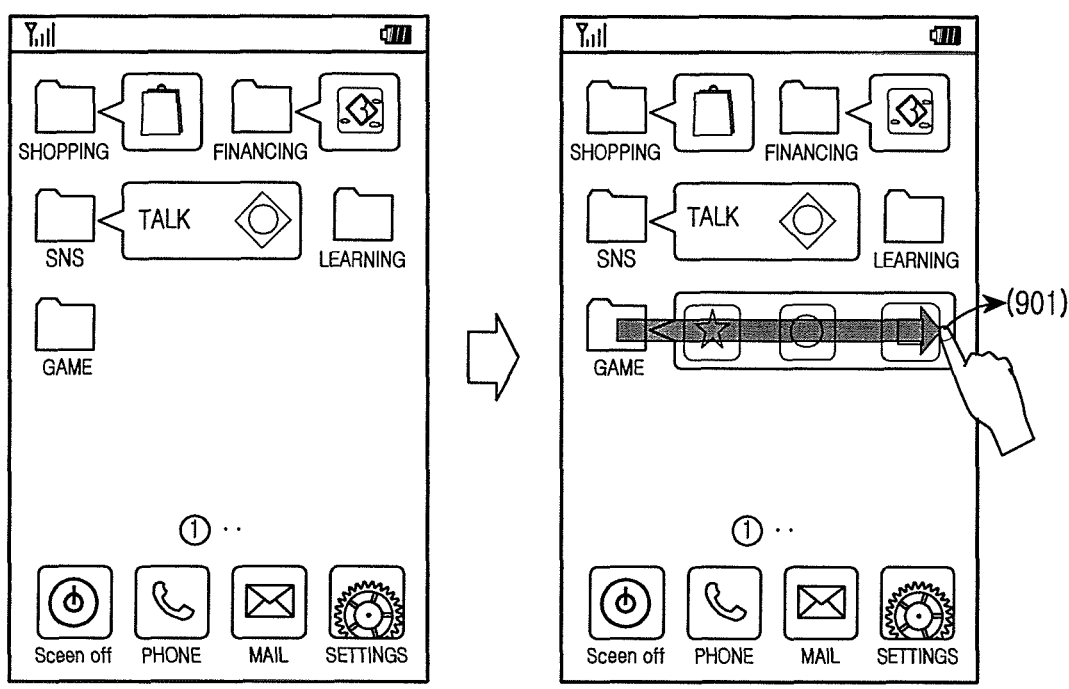
Figure 10:
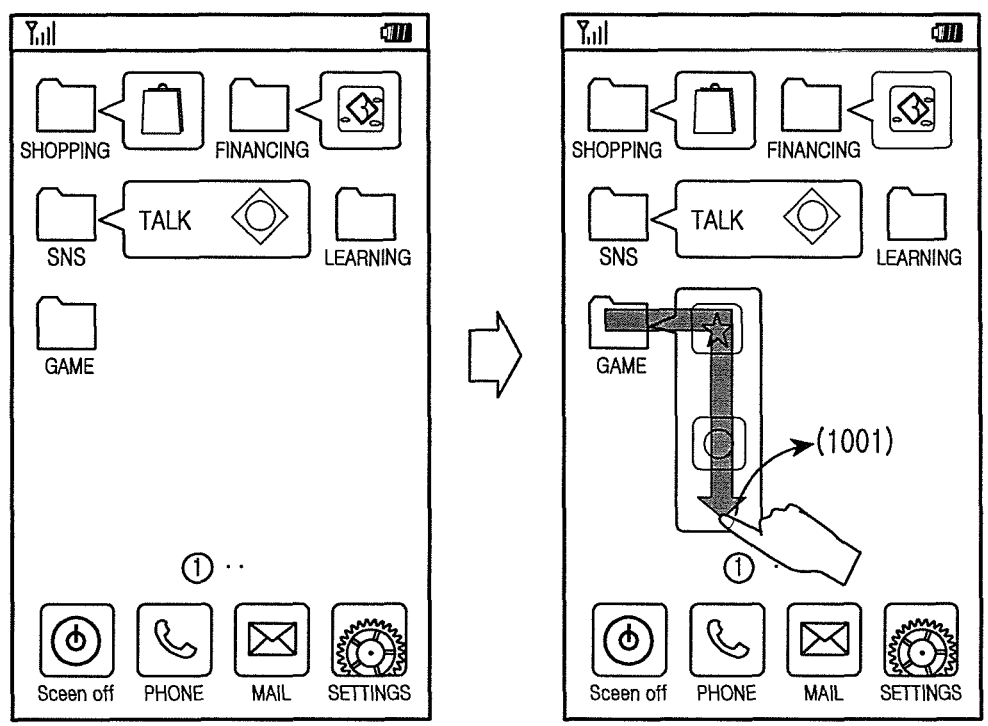

FIGS. 8 to 10 illustrate examples for changing the number of applications displayed on a quick menu window according to a user's dragging in an electronic device 100 according to exemplary embodiments of the present disclosure.

As illustrated in FIG. 8, when a downward drag 801 is detected in a state in which a quick menu window has not been displayed, the electronic device 100 may display a quick menu window having a size corresponding to the dragging direction and dragging length of the drag 801 at a location at which the drag is detected, and display two applications on the quick menu window according to the size of the displayed quick menu window.

As illustrated in FIG. 9, when a right drag 901 is detected in a state in which a quick menu window for a game folder is not displayed, the electronic device 100 may display the quick menu window having a size corresponding to the dragging direction and dragging length of the drag 901 at a location at which the drag is detected, and display three applications on the displayed quick menu window.

As illustrated in FIG. 10, when detecting a drag 1001 that move to the right of the game folder and then downwardly, the electronic device 100 may display the quick menu window having a size corresponding to the dragging direction and dragging length of the drag 1001 at a location at which the drag is detected, and display two applications on the displayed quick menu window.

That is, the electronic device 100 may display a quick menu window including M×N applications for each folder according to user control. With reference to FIGS. 8 to 10, although the above embodiment has been described taking, as an example, a configuration in which a drag is detected on a specific folder in a state in which the quick menu window for the specific folder has not been displayed, and the quick menu window is additionally displayed, it is possible to detect a drag on the specific folder and/or the quick menu window in a state in which the quick menu window for the specific folder has been displayed, and expand the size of the quick menu window according to the dragging direction and length of the drag.

Embodiments of the present disclosure and the operations described in this specification may be implemented in computer software, firmware, or hardware, including the structures disclosed in this specification and their structural equivalents, or in combinations of one or more of them. In addition, embodiments of the present disclosure described in this specification may be implemented as one or more computer program products, i.e., one or more modules of computer program instructions encoded on a computer readable medium for execution by, or to control the operation of, data processing apparatus.

The computer-readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them.

While the disclosure has been shown and described with reference to certain exemplary embodiments thereof, it will be understood by those skilled in the art that various changes in form and details may be made therein without departing from the spirit and scope of the disclosure as defined by the appended claims. Therefore, the scope of the disclosure is defined not by the detailed description of the disclosure but by the appended claims, and all differences within the scope will be construed as being included in the present disclosure.

What is claimed is:

1. A method for operating an electronic device with a global positioning system (GPS) and a display, the method comprising:
    detecting an event for displaying, on the display, a screen comprising folders, each folder including a portion of a plurality of applications that are installed in the electronic device;
    in response to detecting the event, identifying, by using the GPS, a location of the electronic device;
    determining a first application that has been most often executed in the identified location of the electronic device;
    determining, among the folders, a first folder including the determined first application;
    in response to the determination of the first folder, displaying, with the first folder, a first menu window by using the display, wherein the first menu window is adjacent to the determined first folder and includes a first icon for executing the determined first application;
    detecting that the location of the electronic device has changed after the display of the first menu window;
    determining a second application that has been most often executed in the changed location of the electronic device;
    determining, among the folders, a second folder including the determined second application; and
    in response to the determination of the second folder, displaying, by using the display, a second menu window and ceasing to display the first menu window, wherein the second menu window is adjacent to the determined second folder and includes a second icon for executing the determined second application.

2. The method of claim 1, wherein the first menu window and the second menu window comprise a number of applications that is determined based on at least one of system settings, user settings, a frequency of access of a user to the folders, a geographic location of the electronic device, and a time.

3. The method of claim 1, wherein determining the first application comprises:
    identifying a frequency of use of applications included in the folders in the identified location of the electronic device, and selecting the first application that has been most often executed in the identified location based on the identified frequency of use of applications in the identified location.

4. The method of claim 1, further comprising displaying a graphical effect indicating that the first folder and the first menu window are associated with each other, or a graphical effect indicating that the second folder and the second menu window are associated with each other.

5. The method of claim 1, further comprising:
detecting a drag associated with the first folder or the second folder;
in response to detecting the drag associated with the first folder or the second folder, identifying a dragging length and a dragging direction of the drag;
expanding a size of the first menu window or the second menu window based on the dragging length and the dragging direction; and
displaying a number of applications corresponding to the dragging length of the detected drag on the expanded size of the first menu window or the expanded size of the second menu window.

6. The method of claim 1, wherein displaying the first menu window or the second menu window comprises:
determining whether another application or another folder is present on an area adjacent to the first folder on which the first menu window is to be displayed or an area adjacent to the second folder on which the second menu window is to be displayed; and
in response to determining that another application or folder is present on the area adjacent to the first folder or the area adjacent to the second folder, moving the other application or folder to another location and displaying the first menu window or the second menu window on the area adjacent to the first folder or the area adjacent to the second folder.

7. An electronic device comprising:
a global positioning system (GPS);
at least one processor;
a touch sensitive display; and
a memory configured to store at least one program, wherein the at least one processor is configured to execute instructions of the at least one program to:
detect an event for displaying, on the touch sensitive display, a screen comprising folders, each folder including a portion of a plurality of applications that are installed in the electronic device;
in response to detecting the event, identify, by using the GPS, a location of the electronic device;
determine a first application that has been most often executed in the identified location of the electronic device;
determine, among the folders, a first folder including the determined first application;
in response to the determination of the first folder, instruct the touch sensitive display to display, with the first folder, a first menu window, wherein the first menu window is adjacent to the determined first folder and includes a first icon for executing the determined first application;
detect that the location of the electronic device has changed after the display of the first menu window;
determine a second application that has been most often executed in the changed location of the electronic device;
determine, among the folders, a second folder including the determined second application; and
in response to the determination of the second folder, instruct the touch sensitive display to display a second menu window and ceasing to display the first menu window, wherein the second menu window is adjacent to the determined second folder and includes a second icon for executing the determined second application.

8. The electronic device of claim 7, wherein
the first menu window and the second menu window comprise a number of applications that is determined based on at least one of system settings, user settings, a frequency of access of a user to each folder, a geographic location of the electronic device, and a time.

9. The electronic device of claim 7, wherein at least one processor is further configured to:
identify a frequency of use of applications included in the folders in the identified location of the electronic device; and
select of the first application that has been most often executed in the identified location based on the identified frequency of use of applications in the identified location.

10. The electronic device of claim 7, wherein the at least one processor is configured to instruct the touch sensitive display to display graphical effect indicating that the first folder and a first menu widow are associated with each other, or a graphical effect indicating that the second folder and the second menu window are associated with each other.

11. The electronic device of claim 7, wherein the at least one processor is configured to:
detect a drag associated with the first folder or the second folder;
in response to detecting the drag associated with the first folder or the second folder, identify a dragging length and a dragging direction of the drag;
expand a size of the first menu window or the second menu window based on the dragging length and the dragging direction; and
instruct the touch sensitive display to display a number of applications corresponding to the dragging length of the detected drag on the expanded size of the first menu window or the expanded size of the second menu window.

12. The electronic device of claim 7, wherein the at least one processor is configured to:
determine whether another application or another folder is present on an area adjacent to the first folder on which the first menu window is to be displayed or an area adjacent to the second folder on which the second menu window is to be displayed; and
in response to determining that another application or folder is present on the area adjacent to the first folder or the area adjacent to the second folder, instruct the touch sensitive display to move the other application or folder to another location and display the first menu window or the second menu window on the area adjacent to the first folder or the area adjacent to the second folder.

* * * * *